United States Patent
Banks et al.

(10) Patent No.: US 11,209,664 B2
(45) Date of Patent: Dec. 28, 2021

(54) 3D IMAGING SYSTEM AND METHOD

(71) Applicant: NLIGHT, INC., Vancouver, WA (US)

(72) Inventors: Paul S. Banks, San Marcos, CA (US);
Bodo Schmidt, Carlsbad, CA (US); C. Stewart Tuvey, Carlsbad, CA (US);
Lorenzo N. Venneri, Los Alamos, NM (US)

(73) Assignee: NLIGHT, INC., Camas, WA (US)

( * ) Notice: Subject to any disclaimer, the term of this patent is extended or adjusted under 35 U.S.C. 154(b) by 41 days.

(21) Appl. No.: 15/445,560

(22) Filed: Feb. 28, 2017

(65) Prior Publication Data

US 2017/0248796 A1  Aug. 31, 2017

Related U.S. Application Data

(60) Provisional application No. 62/301,587, filed on Feb. 29, 2016.

(51) Int. Cl.
*G02B 30/25* (2020.01)
*G01S 17/894* (2020.01)
(Continued)

(52) U.S. Cl.
CPC ............ *G02B 30/25* (2020.01); *G01S 7/4816* (2013.01); *G01S 7/499* (2013.01); *G01S 17/894* (2020.01);
(Continued)

(58) Field of Classification Search
CPC .... H04N 9/315; H04N 13/218; H04N 13/271; H04N 13/296; H04N 13/254;
(Continued)

(56) References Cited

U.S. PATENT DOCUMENTS 3,569,988 A    3/1971  Schmidt et al.
3,644,017 A    2/1972  Ploss
(Continued)

FOREIGN PATENT DOCUMENTS

DE    4439298 A1    6/1996

OTHER PUBLICATIONS

Google online patent translation of DE4439298A1, Jul. 1, 2014.
(Continued)

*Primary Examiner* — Robert J Hance
(74) *Attorney, Agent, or Firm* — Stoel Rives LLP

(57) ABSTRACT

A 3D imaging system includes an optical modulator for modulating a returned portion of a light pulse as a function of time. The returned light pulse portion is reflected or scattered from a scene for which a 3D image or video is desired. The 3D imaging system also includes an element array receiving the modulated light pulse portion and a sensor array of pixels, corresponding to the element array. The pixel array is positioned to receive light output from the element array. The element array may include an array of polarizing elements, each corresponding to one or more pixels. The polarization states of the polarizing elements can be configured so that time-of-flight information of the returned light pulse can be measured from signals produced by the pixel array, in response to the returned modulated portion of the light pulse.

15 Claims, 6 Drawing Sheets

(51) Int. Cl.
*H04N 13/254* (2018.01)
*H04N 13/218* (2018.01)
*H04N 13/271* (2018.01)
*H04N 13/296* (2018.01)
*G01S 7/481* (2006.01)
*G01S 7/499* (2006.01)
*G02B 26/00* (2006.01)
*G02B 27/28* (2006.01)
*G02F 1/01* (2006.01)
*H04N 5/359* (2011.01)

(52) U.S. Cl.
CPC ......... *G02B 26/001* (2013.01); *G02B 27/286* (2013.01); *G02F 1/0136* (2013.01); *H04N 5/359* (2013.01); *H04N 13/218* (2018.05); *H04N 13/254* (2018.05); *H04N 13/271* (2018.05); *H04N 13/296* (2018.05); *H04N 2213/001* (2013.01)

(58) Field of Classification Search
CPC .. H04N 5/359; H04N 2213/001; G02B 27/26; G02B 30/25; G02B 26/001; G02B 27/286; G01S 17/894; G01S 7/4816; G01S 7/499; G01S 17/89; G02F 1/0136
See application file for complete search history.

(56) References Cited

U.S. PATENT DOCUMENTS

| | | | |
|---|---|---|---|
| 3,838,906 A | 10/1974 | Kumada | |
| 4,734,575 A | 3/1988 | Wagli et al. | |
| 4,935,616 A | 6/1990 | Scott | |
| 4,967,270 A | 10/1990 | Ulich et al. | |
| 5,144,482 A | 9/1992 | Gould | |
| 5,157,451 A | 10/1992 | Taboada et al. | |
| 5,162,861 A | 11/1992 | Tamburino et al. | |
| 5,200,793 A | 4/1993 | Ulich et al. | |
| 5,394,413 A | 2/1995 | Zayhowski | |
| 5,686,990 A | 11/1997 | Laznicka, Jr. | |
| 5,892,575 A * | 4/1999 | Marino | G01C 3/08 356/5.01 |
| 6,088,086 A | 7/2000 | Muguira et al. | |
| 6,456,793 B1 | 9/2002 | Ray et al. | |
| 6,515,737 B2 | 2/2003 | Perry | |
| 6,781,763 B1 | 8/2004 | Tamburino et al. | |
| 7,224,382 B2 | 5/2007 | Baker | |
| 7,224,384 B1 | 5/2007 | Iddan et al. | |
| 7,301,138 B2 | 11/2007 | Yafuso | |
| 7,444,013 B2 | 10/2008 | Chen | |
| 7,751,109 B1 | 7/2010 | Hoffman et al. | |
| 7,995,191 B1 | 8/2011 | Sandusky | |
| 8,106,940 B2 | 1/2012 | Takagi et al. | |
| 8,471,920 B2 * | 6/2013 | Georgiev | H04N 9/0451 348/221.1 |
| 8,823,848 B2 * | 9/2014 | Chipman | G01J 4/04 348/302 |
| 9,177,983 B2 * | 11/2015 | Kuang | H01L 27/14627 |
| 2002/0085608 A1 | 7/2002 | Kopf et al. | |
| 2002/0139853 A1 | 10/2002 | Tsikos et al. | |
| 2003/0089779 A1 | 5/2003 | Giordano et al. | |
| 2003/0178549 A1 | 9/2003 | Lawrence | |
| 2004/0041082 A1 | 3/2004 | Harmon | |
| 2004/0165080 A1 | 8/2004 | Burks et al. | |
| 2006/0077395 A1 | 4/2006 | Chan et al. | |
| 2007/0041075 A1 | 2/2007 | Gupta et al. | |
| 2008/0030611 A1 | 2/2008 | Jenkins | |
| 2008/0060034 A1 | 3/2008 | Egnal et al. | |
| 2008/0150786 A1 | 6/2008 | Breed | |
| 2009/0147112 A1 | 6/2009 | Baldwin | |
| 2010/0128109 A1 * | 5/2010 | Banks | G01S 7/4865 348/46 |
| 2011/0134220 A1 * | 6/2011 | Barbour | G06T 15/00 348/44 |
| 2011/0175981 A1 | 7/2011 | Lai et al. | |
| 2012/0038892 A1 | 2/2012 | Kurtz et al. | |
| 2012/0105594 A1 | 5/2012 | You | |
| 2012/0307018 A1 | 12/2012 | Damstra et al. | |
| 2013/0033575 A1 * | 2/2013 | Kobayashi | H04N 13/261 348/46 |
| 2013/0194675 A1 | 8/2013 | Tocci | |
| 2013/0278713 A1 | 10/2013 | Banks | |
| 2013/0088726 A1 | 11/2013 | Goyal et al. | |
| 2014/0055661 A1 * | 2/2014 | Imamura | G02B 27/286 348/342 |
| 2015/0141753 A1 * | 5/2015 | Kanamori | G02B 23/2461 600/109 |
| 2016/0253551 A1 * | 9/2016 | Pezzaniti | G02B 27/288 382/118 |

OTHER PUBLICATIONS

Cooperheaven, Blaine, PCT Written Opinion of ISA for counterpart PCT application PCT/US2017/020011, dated May 11, 2017, 6 pages.
Mao, Pauline, EPO Partial Search Report and Opinion for counterpart EPO application 17760645.6, dated Feb. 7, 2019, 18 pages.
Skeldon, M.D. et al., "Performance of longitudinal mode KD*P Pockels cells with transparent conductive coatings," SPIE vol. 1410 Solid State Lasers II (1991), pp. 116-124.
Turner, Monte, "Standoff Precision ID in 3-D (SPI-3D)," DARPA website page at http://www.darpa.mil/ipto/programs/spi3d/spi3d_vision.asp, Jan. 12, 2009.
West E.A. et al., "Large Field-of-View KD*P Modulator for Solar Polarization Measurements," Solar Polarization 4, ASP Conference Series, vol. 358, pp. 209-212 (2006).
West, Ed, "DC Bias Modulation Characteristics of Longitudinal KD*P Modulators," SPIE vol. 1746, Polarization Analysis and Measurement, pp. 386-394 (1992).
West, Ed, "Large Field-of-View KD*P Modulator for Solar Polarization Measurements," SPIE 5888-6, pp. 1-9 (2005).
West, Ed, "Large Field-of-View KD*P Modulator," SPIE vol. 1317 Polarimetry: Radar, Infrared, Visible, Ultraviolet, and X-Ray, pp. 312-323 (1990).
Zarrabi, Joseph, "A Compact and Multi-Purpose Diode-pumpd Unstable Laser with Dual Pulse width Output," General Atomics, Photonics Division, San Diego, CA, pp. 1-12 (2006).
Kawakita, Mashiro, "Gain-modulated Axi-Vision Camera (high speed high-accuracy depth-mapping camera)," Optics Express, vol. 12, No. 22, pp. 5336-5344 (Nov. 11, 2004).
Carpenter, Robert, "The Electro-Optic Effect in Uniaxial Crystals of the Dihydrogen Phosphate Type III. Measurement of Coefficients," Journal of the Optical Society of America, vol. 4, No. 4, pp. 225-229 (Apr. 1950).
Billings, Bruce, "The Electro-Optic Effect in Uniaxial Crystals of the Dihydrogen Phosphate (XH2PO4) Type. IV. Angular Field of the Electro-Optic Shutter," Journal of the Optical Society of America, vol. 42, No. 1, pp. 12-20 (Jan. 1952).
Billings, Bruce, "The Electro-Optic Effect in Uniaxial Crystals of the Type X H2PO4. L Theoretical," Journal of the Optical Society of America, vol. 39, No. 10, pp. 797-801 (Oct. 1949).
Billings, Bruce, "The Electro-Optic Effect in Uniaxial Crystals of the Type XH2PO4. II. Experimental," Journal of the Optical Society of America, vol. 39, No. 10, pp. 802-808 (Oct. 1949).
Billings, Bruce, "Scalar Polarization Fringes Produced by the Superposition of Crystalline Plates," Journal of the Optical Society of America, vol. 34, No. 5, pp. 267-269 (May 1944).
Enemark, E.A. et al., "A Pockels Cell Light Modulator for Wide Angle Radiation," The Review of Scientific Instruments, vol. 40, No. 1, pp. 40-41 (Jan. 1969).
Lange, R. et al., "Time-of-flight range imaging with a custom solid-state image sensor," Laser Metrology and Inspection, Proc. SPIE, vol. 3823, pp. 1-12, Munich, Germany (1999).
Marino, Richard et al., "A compact 3D imaging laser radar system using Geiger-mode APD arrays: system and measurements," Laser Radar Technology and Applications VIII, Proceedings of SPIE vol. 5086, pp. 1-15 (2003).

(56) References Cited

OTHER PUBLICATIONS

Ringbeck, Thorsten et al., "A 3D Time of Flight Camera for Object Detection," Optical 3-D Measurement Techniques Jul. 9-12, 2007 ETH Zürich Plenary Session 1: Range Imaging I, 10 pages (2007).

\* cited by examiner

3D IMAGING SYSTEM AND METHOD

CLAIM OF PRIORITY UNDER 35 U.S.C. § 119

The present Application for Patent claims priority to Provisional Application No. 62/301,587; entitled "Simplified 3D Imaging Camera," filed Feb. 29, 2016; and hereby expressly incorporated by reference in its entirety as though set forth fully herein.

TECHNICAL FIELD

The disclosure generally relates to three dimensional (3D) imaging and, more particularly, to cameras or systems for capturing 3D information.

BACKGROUND

Capturing the 3D position of surfaces and objects in a scene is becoming more and more commonplace for applications such as robotic vision, autonomous vehicles, and video game controls. An ideal 3D camera is able to capture the 3D information along with images or video in high resolution in the same way two dimensional (2D) video cameras and cell phone cameras function today. Size, weight, and power requirements for such camera are important considerations. Current approaches to accomplish this suffer from weaknesses in resolution and operating range, as well as high cost and large physical size for some.

Several technologies that are currently used to acquire 3D coordinates across a scene as an image all have their strengths, but also weaknesses and fundamental limitations that prevent them from delivering high quality 3D imaging and video.

A common approach to 3D, especially for low cost, is stereoscopic cameras that use multiple lenses and sensors separated by a baseline distance to provide a 3D effect. However, there actually is no 3D data for the vast majority of stereo cameras, even the high-end cinematography rigs—the 3D effect being an optical illusion at the display. This is not useful for some applications that require 3D information or coordinates. The stereo images can be used to generate 3D geometry data using photogrammetry (triangulating the distance with corresponding pixels of the two sensors), but this requires precise calibration and mechanical volume for the baseline separation as well as significant processing. The effective operating ranges are limited to shorter ranges for typical baselines, and the performance of photogrammetry from stereo camera pairs is sensitive to lighting conditions and shadows. Such devices do not operate well in dark or challenging lighting and require substantial computational resources; these characteristics make extracting real-time data difficult in small systems. Thus, photogrammetry is not an adequate solution for some applications.

A related solution that is used projects light patterns onto the objects in the scene and uses a separate sensor to detect deviations in the pattern. Structured light projectors and image sensors require distinct transmit and receive apertures that must be precisely aligned and separated by sufficient distance for good distance performance. These systems either use several patterns that limit the lateral resolution for range information or use multiple images that cannot be used for fast moving objects.

Beyond these geometric solutions to measuring distance, significant amounts of developmental efforts have concentrated on developing time-sensitive sensors that measure the time of flight for light to transit to the scene objects and return to the 3D camera sensors. There are various techniques used to measure the time, but all involve circuitry corresponding to each pixel that control the response of the pixel and record the time of arrival (either by amplitude or phase) of the light for that pixel. The complexity of such circuitry, as well as the extensive data that is recorded, has stymied development of such sensors, with even the most advanced time-sensitive sensors limited to 100-200 pixels on a side. Further scaling may require further costly chip development, if ways can be found to reduce the pixel size. Many of these techniques are also sensitive to lighting conditions and have been limited to short range, indoor use to date. For these solutions, each pixel is timed precisely with respect to a master clock and with respect to each other to obtain satisfactory performance in range measurement, further complicating the ability to scale time-sensitive sensors beyond the current state-of-the-art, which is insufficient to be widely used beyond the current use of coarse gesture recognition.

Small 3D cameras using various temporal modulation schemes have been produced. All of these approaches require new specialized imaging sensors and electronic circuitry to achieve the 3D effect and are limited to approximately 200 pixel×160 pixel arrays or smaller. Even though the pixel count has been increasing slowly over time, it is still low and significant work is still needed to improve. They also have limited range (<5 m) and perform poorly in bright lighting (e.g., outdoors). These sensors have been shown to be unsuitable for the some industrial applications. High-end 3D measurement instruments can achieve some of the needed performance, but none are close to real-time, require extensive labor, and have no path to the cost targets required for many applications.

Other known technologies related to the 3D imaging approach disclosed herein include prior attempts at using polarizing grids and single sensor arrays in various imaging applications.

Polarizing grids coupled with sensor arrays have been used to measure polarization states of the incoming light. The most common approach is to use grids comprised of polarizing elements of 4 different orientations, such as vertical, horizontal, 45°, and 135° that are used to measure the Stokes vector of the incoming light at that pixel. The Stokes vector determines the polarization state of the incoming light. The change in the polarization state of the incoming light from pixel to pixel across the sensor array can be used to estimate a change in surface normal of a surface being imaged onto the sensor array.

For 3D imaging applications, the change in surface normal can be used to derive a measurement of the slope of the surface being imaged which then can be used to derive a depth position relative to the surrounding surface. This technique has been used to extract 3D surfaces from smooth optical surface, for example to measure the curvature of the optical surface. See "Pixelated Phase-Mask Dynamic Interferometer," Fringe 2005, Springer Berlin Heidelberg (2006) by J. Millerd, N. Brock et al.; "CCD polarization imaging sensor with aluminum nanowire optical filters," Opt. Express 18, p. 19087-94 (2011) by V. Gruev, R. Perkins, and T. York.

While such techniques can and have made use of polarizing grids to measure polarimetry of incoming light in 3D applications, these previous efforts all make only a relative measurement of the surface position. In contrast, the new methods and systems disclosed herein make use of a polarizing grid, combined with the modulator, to measure the time-of-flight of the emitted and reflected light to derive an absolute position of the surface being imaged.

U.S. Pat. No. 7,301,138 to Yafuso describes an approach to use a single sensor array combined with a Pockels cell. This approach uses a Wollaston prism and series of optical lenses to split the polarization elements into two optical paths that are separated with distance. This approach adds additional optics to the system, resulting in a more complex optical design that increases cost as well as size and weight. The images that are created on the single sensor array are distinct images, essentially creating two independent sensor arrays from the single array. These two images must be calibrated and registered in the same fashion as if two separate sensor arrays had been used. The alignment of the sensor array is eliminated, but the separate optical paths for the two polarization states means that each state is subject to unique distortions that require essentially equivalent compensation, registration, and calibration as if two sensor arrays had been used.

Known techniques of 3D imaging, some of which have been described above, have serious limitations that make them impractical or unsuitable for some applications. Thus, there is a need for an improved 3D imaging technique.

SUMMARY

To address the foregoing shortcomings, the techniques disclosed herein provide an improved 3D imaging system. The system includes an optical modulator configured to modulate a returned portion of a light pulse as a function of time. An array of optical elements, also included in the system, can receive the modulated returned portion of the light pulse. At least one of the optical elements of the array has a first optical transmission state different from a second optical transmission state of another of the optical elements. A sensor array of pixels corresponding to the array of optical elements is positioned within the system to receive light output from the array of optical elements.

In accordance with another aspect of the disclosed techniques, a method of 3D imaging includes: illuminating a scene with a light pulse; modulating a returned portion of the light pulse; and passing the modulated returned portion of the light pulse through an array of optical elements. At least one of the optical elements has a first optical transmission state different from a second optical transmission state of another of the optical elements. A sensor array of pixels receives light output from the array of optical elements. 3D information regarding a scene is generated based on signals produced by the sensor array in response to the modulated return portion of the light pulse that passed through the array of optical elements.

The foregoing summary does not define the limits of the appended claims. Other aspects, features, and advantages will be or will become apparent to one with skill in the art upon examination of the following figures and detailed description. It is intended that all such additional features, aspects, and advantages be included within this description and be protected by the accompanying claims.

BRIEF DESCRIPTION OF DRAWINGS

It is to be understood that the drawings are solely for purpose of illustration and do not define the limits of the appended claims. Furthermore, the components in the figures are not necessarily to scale. In the figures, like reference numerals designate corresponding parts throughout the different views.

DETAILED DESCRIPTION

Figure 1:
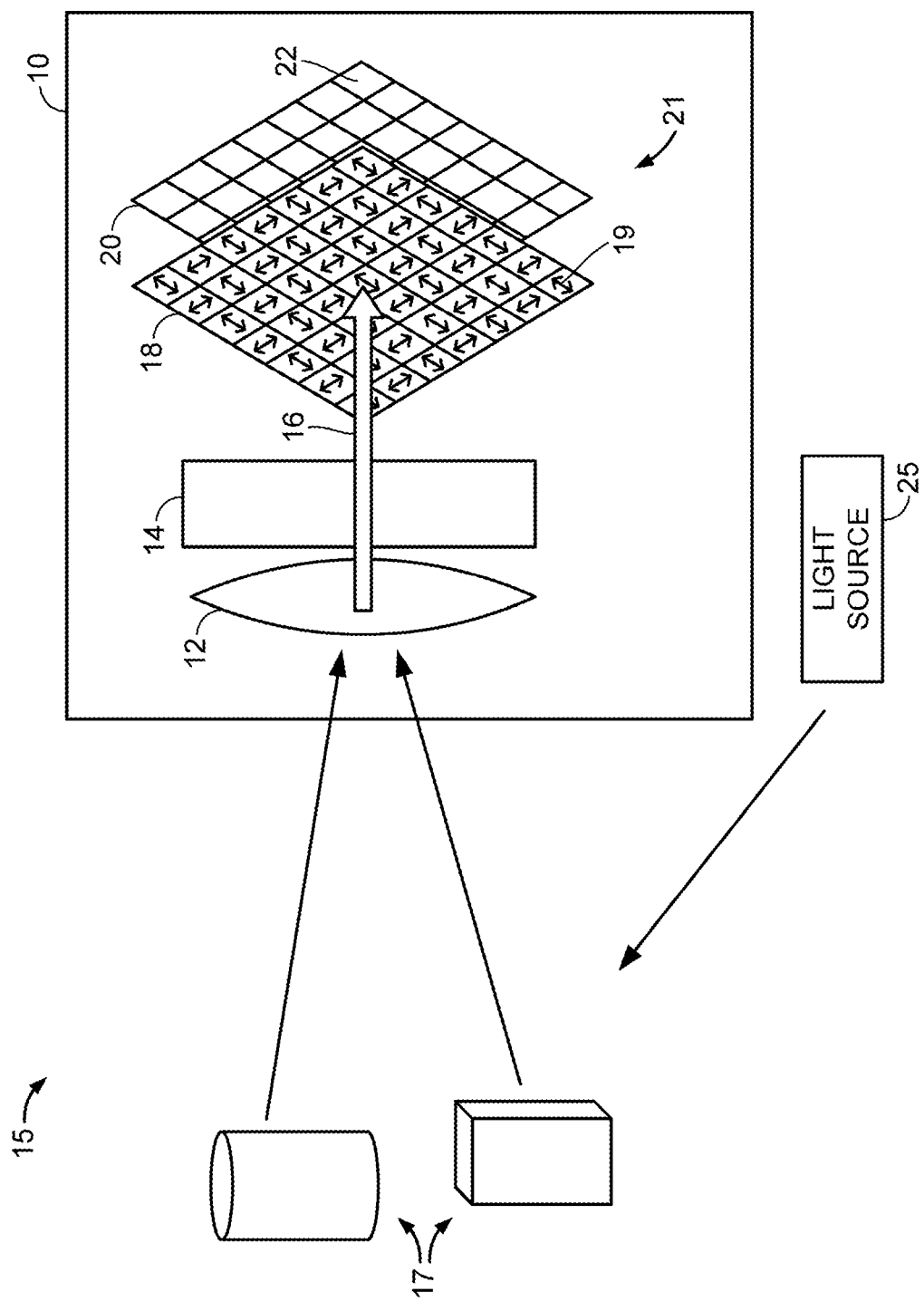
FIG. 1 is a simplified conceptual diagram of an example 3D (three-dimensional) camera employing a modulator and a polarizing grid array.

The following detailed description, which references to and incorporates the drawings, describes and illustrates one or more specific 3D imaging systems and methods. These configurations, offered not to limit but only to exemplify and teach the methods and systems, are shown and described in sufficient detail to enable those skilled in the art to practice the techniques. Thus, where appropriate to avoid obscuring the systems and methods, the description may omit certain information known to those of skill in the art. The disclosures herein are examples that should not be read to unduly limit the scope of any patent claims that may eventual be granted based on this application.

The word "exemplary" is used throughout this application to mean "serving as an example, instance, or illustration." Any system, method, device, technique, camera feature or the like described herein as "exemplary" is not necessarily to be construed as preferred or advantageous over other features.

Generally, the techniques disclosed herein are to place a grid of optical elements in front of or on the front surface or within the stack of pixel elements of the detecting surface of an imaging sensor array, for example a focal plane array (FPA). These elements can be used to distinguish the signal from different modulation states (including modulated/unmodulated states) and are designed based on the underlying modulation technique. For example, such elements could use patterns of polarization elements for phase modulation that results in a polarization change or patterns of transmissive elements for Fabry-Perot cavities and other phase modulation. Such elements can be designed and combined in one or more ways to distinguish states of the system, including variations in polarization transmission, spectral transmission, phase transmission, intensity transmission, or similar property of light.

A compact 3D camera system may be achieved by integrating the elements of a modulated sensor approach described U.S. Pat. No. 8,471,895 B2 issued on Jun. 25, 2013, which is incorporated by reference in its entirety as if fully set forth herein (referred to herein as the "'895 patent") with a polarizing or transmission grid array. Examples of 3D imaging systems and methods that may be modified to implement the methods and systems described herein are disclosed in the '895 patent at, for example, FIGS. 1-12 and their accompanying written description in the '895 specification. Those portions of the '895 patent describe 3D imaging systems that can be configured to perform the methods and to include the polarizing or transmission grid arrays disclosed in the present application, and are specifically incorporated by reference herein.

Additionally or alternatively, the pulse light source and methods described in U.S. patent application Ser. No. 14/696,793 filed Apr. 27, 2015, entitled "Method and System for Robust and Extended Illumination Waveforms for Depth Sensing in 3D Imaging" may be used with the systems and methods disclosed herein, and the subject matter of this application is hereby expressly incorporated by reference in its entirety as though set forth fully herein.

As disclosed herein, several elements provide the capability of a more compact, monolithic design either separately or in combination. Instead of placing complex circuitry and timing algorithms behind each photosensitive pixel, the inventive techniques place the required time-dependent elements in front of each pixel or the array of pixels or photo-sensitive elements. Instead of using electronic means to affect the voltage or charge signals at each pixel, the inventive techniques uses optical, electro-optic, or other means of affecting the light field in front of each pixel or groups of pixels to affect the photon signal. These optical means may be placed in close proximity to the sensor array, between the sensor array and corresponding optical elements, or in front of such optical elements to allow extraction of time or depth (e.g., z-axis distance) information from the incident light field including time-of-flight information.

The use of a modulator (external to the sensor array) as described in the '895 patent (specifically modulators 524, 700-701 1124, 1224 disclosed in the '895 patent, which description is specifically incorporated by reference herein) to encode the range information eliminates the need for costly custom sensor array or chip development, especially the challenge of scaling chips that can provide high precision timing information which have been limited to about 200 pixels. Combining the modulator approach with a polarizing grid coupled and aligned to a sensor array eliminates the need to have two separate sensor arrays and bulky polarizing components such as a polarizing beamsplitter. With a single sensor array, there is alignment and registration between two virtual arrays. The location of each polarization pixel is automatically known relatively to the pixels of the orthogonal polarization in position and angle of any surface normal. This reduces manufacturing and calibration complexity.

The use of the polarizing grid also greatly reduces the thickness of the glass or other material that is used for polarization separation elements, which reduces the amount of spherical and other optical aberrations. In prior systems, these aberrations either degraded the optical performance of the optical system of the 3D camera, or the optical system must be adapted with custom designs to remove or compensate such aberrations. With the techniques disclosed herein, the amount of aberration compensation required of optical elements is reduced or eliminated.

Additionally, the use of the polarizing grid opens the possibility of making the modulator/polarization separation/sensor array into a closely coupled or monolithic optical assembly that can be used directly with catalog optical lens or imaging elements. In some circumstances, such as wafer scale manufacturing, no lenses or relay optics would need be placed between the optical modulator and the sensor array/polarizing grid. This can reduce the size and cost of the 3D camera system.

The data streams produced and processed by the 3D camera become simpler since there is only one sensor array and no need to time with other sensor arrays. It also becomes simpler to combine multiple 3D cameras or modules together as described in the'895 patent (for example, to use different range windows and modulation waveforms to extend the range window without worsening the range resolution achievable), such as described in the '895 patent with reference to FIG. 10, which portions of the '895 patent are specifically incorporated by reference as though fully set forth herein.

As shown in FIG. 1, an electro-optic module 21 includes a grid of polarization elements 18 is placed in front of, or possibly on, the surface of an imaging sensor 20 such as a charge coupled device (CCD) or complementary metal oxide semiconductor (CMOS) array of pixels. In some configurations, the polarization grid layer 18 can be placed directly on the surface of the sensor array 20 using an additional step or steps in the lithographic processing. In others, the grid layer 18 can be placed on a transparent substrate that is then placed on or in front of the sensor array. In other configurations, the polarizing grid 18 can be placed within the layers that are above the detector or electronic sites of a sensor array. The polarizing grid 18 is aligned such that the center of each polarizing element 19 is positioned approximately coincident with the center of each pixel 22. For some configurations, the grid 18 is arranged so that alternating polarizing elements pass orthogonal polarizations. For example, if the first polarizing element is oriented to pass vertical polarization, the next element in the row or column is oriented to pass horizontal polarization. Instead of linear polarizing elements, orthogonal circular polarizing element, both left-handed and right-handed, can also be used. Other configurations may use other patterns of polarizing elements, including elements that pass non-orthogonal polarizations.

Any suitable manufacturing technique may be employed to build the polarizer element array. For example, the polarizing elements 18 can be made using a variety of techniques, including metal wire-grid polarizers, thin film polarizing layers, stressed polymers, and elements made of liquid crystal devices as well as any other technique that preferentially passes a particular polarization state over others. In some cases, the polarizing elements can be made of material that can be changed with some control signal, either between each pulse or during the pulse. Such elements can be deposited by a variety of methods using film deposition techniques. Some can be created by lithographic techniques such as interspersed exposure (including by multiple beams or wavelengths), etch, and deposition steps. Other such elements can be created by stretching or otherwise stressing materials such as polymers. Some elements can be created by e-beam or laser writing of shapes and structures of the appropriate spacing or dimensions.

For some configurations, elements that are insensitive to wavelength can be used to support 3D imagery with multiple illumination wavelengths or with broadband illumination. In other configurations, elements with narrow acceptance bandwidths can be used as the polarizing elements to more effectively discriminate between desired and undesired wavelengths of light.

By using lithographic fabrication processes, any polarizer grid to sensor array misalignment and non-uniform spacing, non-ideal polarizer performance, and cross-talk between the pixels can be reduced. Because both the polarizer grid and the sensor array can be fabricated using lithographic processes, uniformity of spacing are determined by the mask design, which is normally accurate to nanometer levels. Alignment fiducials can be used to align the two grids and lithographic precision permits accurately matching the pitch of the grid elements.

Non-ideal polarizer performance would result in location shifts of the minima and maxima of output light. This non-ideal behavior can be handled by calibration of the response at various times. Equally, imperfect polarization contrast (the ratio between the transmission of the transmitted polarization and the rejected polarization) can be managed by proper system calibration. For example, polarization contrasts of approximately 5:1, 10:1, or higher can be used with acceptable performance.

In the event of pixel cross-talk, or light or signal incident on one polarizer element reaching a pixel other than that corresponding to the polarizer element can also be accounted for by calibration. Different calibrations can be performed to account for any changes in the cross-talk that may occur over short or long time scales. Such calibration can be performed at a single time or may be performed at several times or during the operation of the 3D camera. Such calibrations can be implemented using lookup tables (LUTs) or other functions or forms.

An effect may be performance changes as the angle content of the incident light changes, for example by changing the f/ # of the collecting optics. Higher f/ # optics may be used to reduce cross-talk.

Some configurations may reduce cross-talk by constructing the polarizing grids to use opaque separator bands or structures between pixels. Such bands or structures reduce the amount of light that can cross from one pixel position to neighboring pixel positions or pixels. In some configurations, such bands or structures may also reduce overall effective transmission efficiency. Other structures can be implemented to reduce cross-talk, including structures on either side of the substrate. For example, opaque or reflective structures can be created in the space between pixels that would block light that is transmitted through the grid element from being transmitted to the detector of a neighboring pixel. Such structures or bands may be placed in front of the polarizer array, behind the polarizer array, within the layers of the sensor array, or around the photosite or photosites of the sensor array, as well as within the polarizer array itself. In some configurations, guard pixels between the polarization states could be used where the signal is ignored. For example, if the sensor array pixel size is small, for example three microns, a polarizer element might be nine microns wide with a three micron separator that covers the guard pixels. Alternatively, guard pixels could be used with no special separation existing on the grid structure between elements.

For some configurations, some of the elements of the polarizer array may have no polarization properties or reduced polarization properties, forming the basis to determine the normalization signal. Any suitable arrangement of polarization elements and non-polarization elements in the grid can be used depending on the application and system design. These non-polarization elements can be approximately uniform in transmission for multiple wavelengths or they can vary similar to Bayer patterns for color cameras or different filters for IR or thermal cameras or other arrangements at other wavelengths or wavelength regions. For example, they may be opaque or less transmissive of light.

In some arrangements, the polarizer grid elements can be larger than a single pixel of the sensor array, for example 2×2, 3×3, 4×4, or other multiple. The elements can also be rectangular, for example, 2×1, 3×2, or other multiple or aspect ratio or any other arrangement that is non-rectangular in shape. If the grid elements are larger than one pixel, the transmissive elements may be further divided into individual areas that transmit different amounts based on wavelength or angle or other similar optical property.

In the processing software, the detected signal from the pixels in the sensor array 20 can be binned or otherwise processed to improve the robustness of the measurement, reduce sensitivity to noise or other deleterious effects, or otherwise improve the signal to noise ratio of the individual measurements. Values from different elements or different types of elements can be combined in many ways, depending on the algorithm implemented and the result desired.

Alternatively, for other modulation schemes, such as Fabry-Perot cavities or other phase-based modulation schemes, where polarization modulation is not used, arrays of elements that vary in transmission between elements in some pattern similar to that described above can be employed instead of polarization elements. Some elements can be relatively low transmission that may provide the needed finesse for a Fabry-Perot cavity while some elements can be relatively high transmission. The high transmission elements (coupled with high transmission elements on the other side of the Fabry Perot cavity) can be used to determine the unmodulated reference signal, including interpolating the signal to the lower transmission elements for determination of the relative modulation signal as described in the base patent. The arrangement of these pixels can be grouped in various ways, as described in more detail below.

For other configurations, the gain of individual pixels, columns, rows, or other arrangements of groups of pixels in the sensor arrays can be adjusted or set to different values to reduce contrast between the groups of elements where there is significant signal or to increase the contrast between pixels or groups of pixels where there is lower signal, thereby increasing the dynamic range of the sensor or 3D camera. Some configurations could make use of additional filters that change transmission in front of pixels or groups of pixels. For example, a Bayer pattern RGB filter could be used or other pattern of differing transmissive properties. Such filter elements could also be used where multiple wavelengths of light are used, either for illuminating the scene for the 3D camera or for acquiring specific background or ambient illumination.

Polarizing Arrays

An improved way of eliminating the bulky optics that have been previously used in some 3D cameras to separate polarization states is to place a polarizing element in front of each pixel of a sensor array. Such micro-grid polarizing arrays can be used to measure the absolute or relative time-of-flight. Absolute distance measurements can be used in a 3D camera, for among other things, to reduce error buildup, particularly where multiple objects or surfaces are within the scene and where they are not connected, or the connection is not visible from the camera.

FIG. 1 is a simplified perspective-view conceptual diagram of an example 3D camera 10 employing a modulator 14 and a polarizing grid array 14 that receive incoming light 16 through a receiving lens 12. For the present disclosure, the laser illumination (incoming light) 16 is imaged by the lens 12 onto the camera sensor array 20 through the polarizer array 18 with a pattern of polarization directions or transmission parameters such as shown in FIG. 1. For example, the figure shows alternating horizontal and vertical linear polarizers in array 18 arranged to be in front of each pixel 22, but other arrangements and/or circular or elliptical polarization can be used.

As shown in FIG. 1, the camera 10 captures 3D information and may also capture image or video from a scene 15 having objects 17 that scatter or reflect illumination light emitted from a light source 25. The light source 25 may be integrated with the camera 10 as an illumination subsystem as described in the '895 patent, or alternatively, it may be separated from the camera 10. The light source 25 may be any suitable means for illuminating the scene 15, including those described in the '895 patent.

Although shown as having separated elements in FIG. 1, in some configurations of the camera system 10, the electro-optic module 21 may include the optical modulator 14, grid 18, and sensor array 20, as well as an optional polarizer (not shown) located in the optical path before the modulator 14 integrally formed together as a single unit. This highly integrated configuration of the electro-optic module 21 may be constructed using the lithographic, etching and deposition techniques described herein.

Figure 2B:
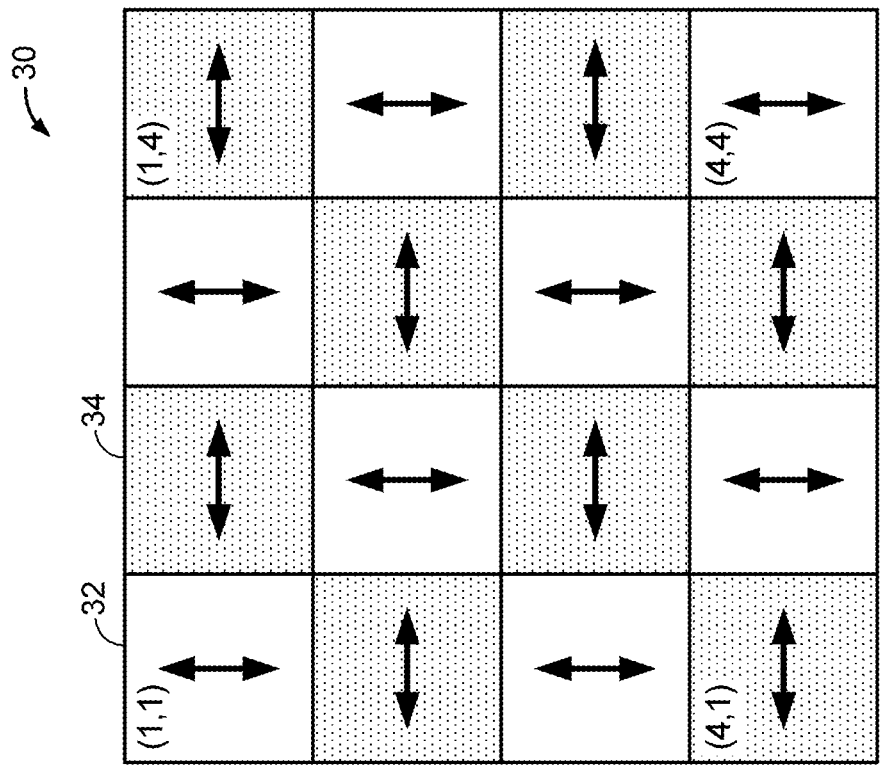
FIGS. 2A-B are simplified conceptual diagrams of an example first polarizing grid array showing a first arrangement of polarizing elements.
Figure 2A:
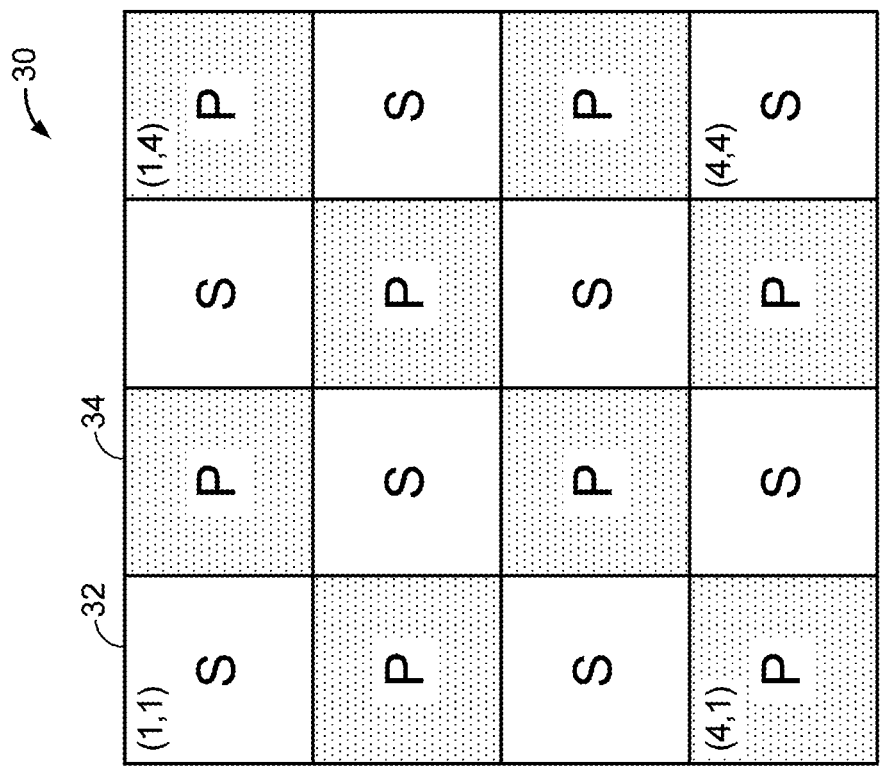

An example polarizer array 30 arrangement is shown in greater detail in FIGS. 2A-B, where S indicates a vertical linear polarizer 32 and P indicates a horizontal linear polarizer 34. (Other arrangements can also be used where S and P can be any two different polarizations, or represent a non-polarizer.) The array 30 can be used as array 18 in FIG. 1. The array 30 can be manufactured separately on a glass substrate and then aligned and placed using standard alignment techniques so that each micro-polarizer is positioned such that its center approximately is coincident with the center of the underlying pixel, as shown in FIG. 1.

Alternatively, the grid of polarizers 30 can be created directly on the sensor array surface, such as the passivation layer, using standard lithographic techniques. For example, a metal layer such as aluminum can be deposited on the surface followed by a photoresist layer, exposing the photoresist with the appropriate mask, etching the exposed photoresist and metal in order to remove preferentially some of the metal layer, and then removing the remaining photoresist and leaving the desired metal structure. These metal layers can be <1 µm thick in some cases, or <5 µm thick or other thicknesses as appropriate. Other materials or techniques can be used to create the polarizing effect, including etching structures directly into the sensor surface or into the layers deposited above the sensor surface, such as the passivation layer. Examples of such materials or techniques is to deposit or arrange stressed polymers or other thin film polarization layers in the gridded pattern. Or liquid crystal devices or structures can be deposited, some with electrically induced patterning. In others, direct etch techniques such as e-beam or laser writing can be used to create a patterned structure. Such layers may be created in a single step or in multiple steps or in multiple layers or in combination of materials and techniques. These techniques and others known to practitioners of similar techniques can be used to create the patterned polarizing elements.

Figure 5:
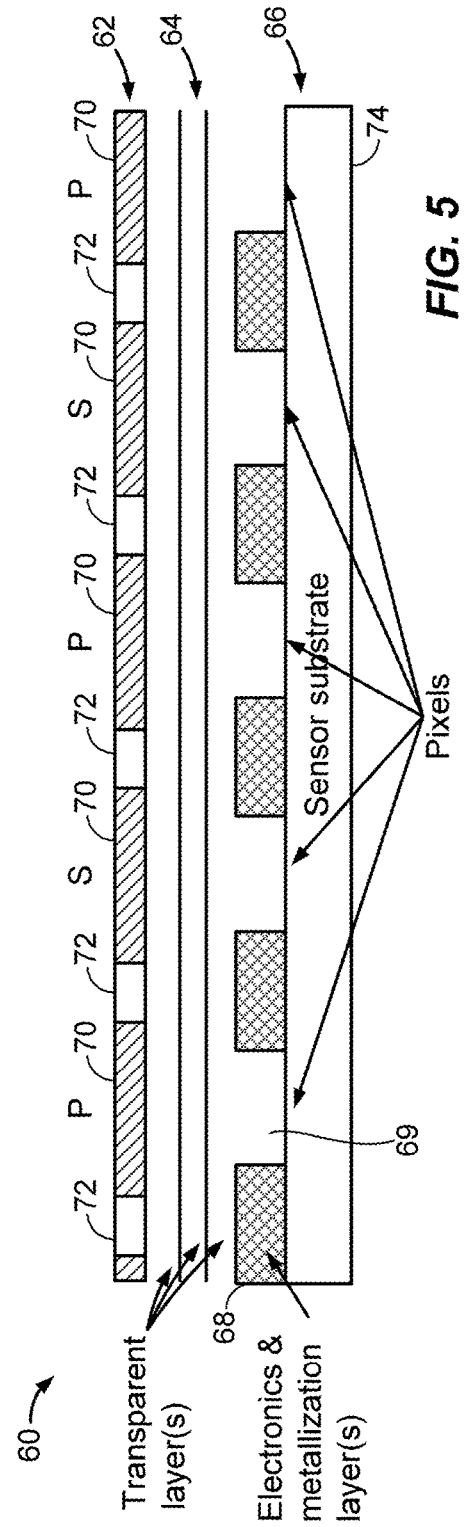
FIG. 5 is a side view of an example grid array pixel structure having guard bands.
Figure 6:
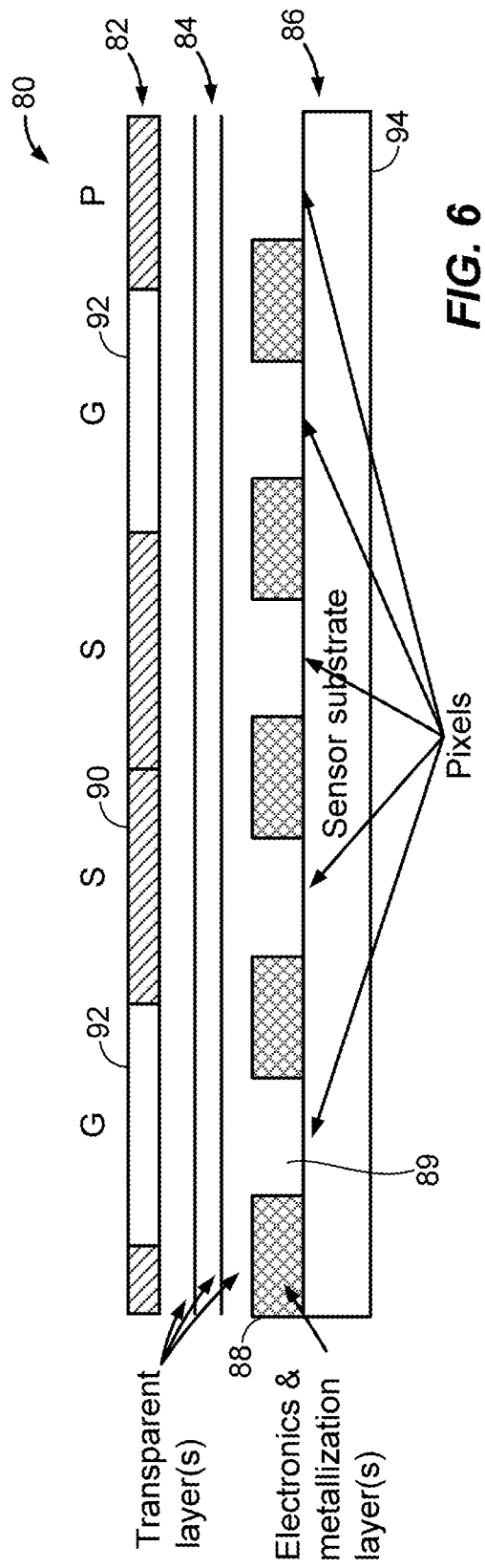
FIG. 6 is a side view of another example grid array pixel structure having another configuration of guard bands.
Figure 7:
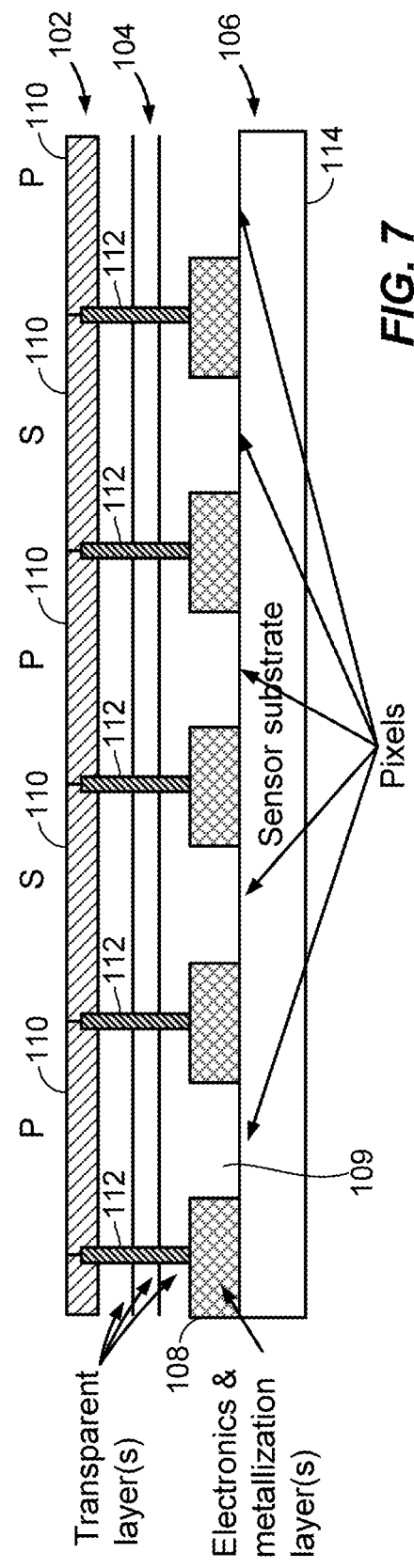
FIG. 7 is a side view of a further example grid array pixel structure having vertical guard bands.

The polarization element array 30 may also be placed in any of several layers in the stack of layers on the top of the sensor array such as shown in the examples of FIGS. 5-7. The deposition methods described for creating the polarization elements on the sensor itself (or accompanying layers) can also be used to create polarization elements on a separate transparent or semi-transparent substrate (layers 64 of FIG. 5, layers 84 of FIG. 6, and layers 104 of FIG. 7) to be place in front of the sensor array. Such a separate substrate or integrated layer may also have anti-reflection coatings applied to maximize transmission or to minimize stray light. Any suitable technique that provides for discrimination between polarization states can be used for the methods and systems disclosed herein; some techniques provide a contrast (or ratio) between desired polarization states and undesired polarization states of >500:1, some >100:1, some >50:1, and some >10:1.

As illustrated in FIGS. 2A-B, for pixels that are approximately the same size as the polarization elements 32, 34, the pixel in the (1,1) position provides a response based in large part on the component of the photon flux incident on pixel (1,1) that is polarized vertically. The pixel in the (1,2) position provides a response level substantially proportional to the component of the photon flux incident on pixel (1,2) of the alternate polarization. And so on for each pixel across the entire sensor. Alternatively, the major polarization axes can be tilted at any angle. For some configurations, the major axes of the alternating polarizers are orthogonal. For other configurations, the major axes may not be orthogonal. For example, a vertical polarizer could be combined with a second polarizer type, the polarization axis forming a 45° angle with respect to the first polarizer. Other configurations may use more than two polarizer types, using three, four, or more polarizer types. For example, a combination of three polarizer types may have polarization elements forming angles with respect to vertical of 0°, 45°, and 90°, or 0°, 30°, and 60°, or other combination of orientations. In other configurations, these angles may be referenced with respect to the horizontal or any other direction. The pattern in which these are arrangements can also vary from the checkerboard pattern shown in FIGS. 2A-B. For example, the S elements can be arranged on either entire rows or columns, respectively, and the P elements can be arranged on either alternating rows or columns. In some configurations, more of one polarizer type may be present than another or than others.

In other configurations, the polarizing elements can be sized to be the size of more than one pixel grouped together (an example is shown in FIG. 6). For example, the polarizing elements can be 11 µm×11 µm if the pixel size or pixel pitch is 5.5 µm (2×2 pixel grouping). Such pixel groupings may comprise other suitable numbers of pixels such as 3×3, 1×2, 3×4, or any other number or arrangement. Any other suitable pixel size or pitch can be used with the arrays described herein, for example 3 µm or 7 µm or 15 µm. The pixel size or pitch may be non-regular or all pixels may be of the same size. For some configurations, the polarization elements can be aligned to the pixel boundaries, or the centroid of each polarization element aligned to the centroid of the corresponding pixel. In other configurations, at least some of the elements may be misaligned in some patterns that can be assessed using Fourier transform techniques and signal processing or other processing algorithms.

Figure 4:
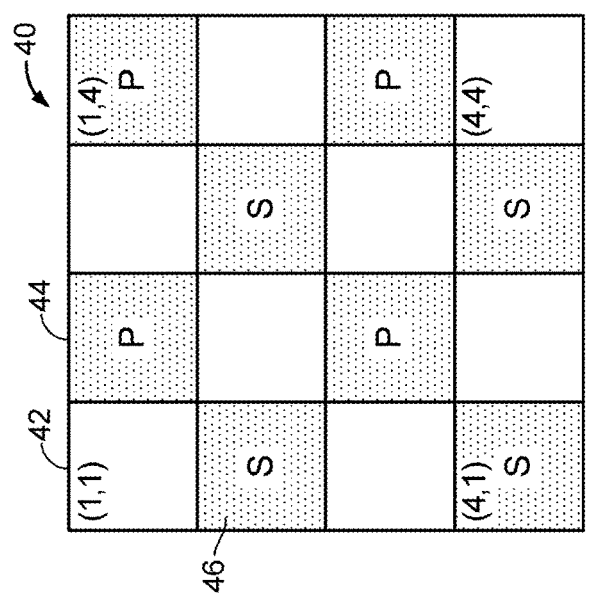
FIG. 4 is a simplified conceptual diagram of an example third polarizing grid array showing a third arrangement of polarizing elements.

Alternatively, instead of linear polarizing structures for each pixel, circular polarizing structures 50 of FIG. 4 can be used to distinguish polarization states as described above. For example, instead of linear polarization, the S elements 32 in FIGS. 2A-B can instead be right circular polarizing elements 52 and the P elements 34 can be left circular polarizing elements 54 as shown in FIG. 4. Any type of polarizing structure or combination of structures can be used in the disclosed camera system, including pairs of elements with an orthogonal polarization orientation. In some configurations, the polarizing elements may be elliptical polarizing.

Figure 3:
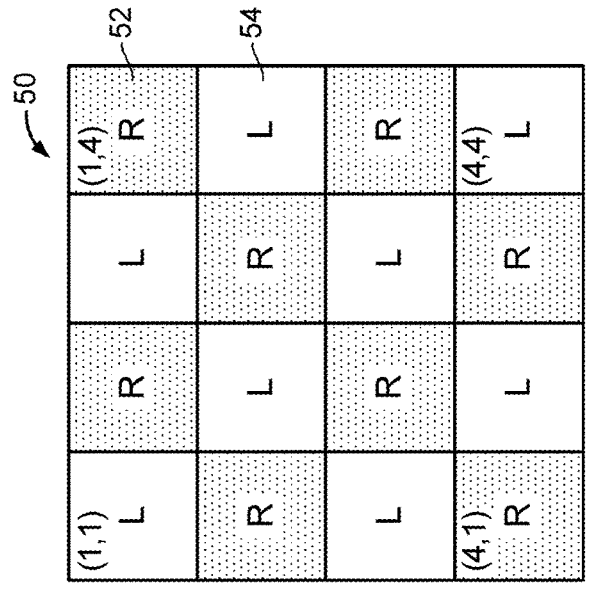
FIG. 3 is a simplified conceptual diagram of an example second polarizing grid array showing a second arrangement of polarizing elements.

Another potential arrangement for a polarizing grid array 50 is illustrated in FIG. 3, where some of the pixels 42 are not polarizing structures at all and instead transmit all polarizations. In this figure, the unlabeled elements 42 do not have a polarizing element and the other elements S and P, 44, 46 are as above. The non-polarizing elements 42 may all have the same or similar transmission properties, for example transmitting nearly 100% of the light. Alternatively the non-polarizing elements may transmit less than 90% of the incident light or less than 50% or less than 10% of the incident light or any other transmission percentage. The transmission percentage may also be patterned for use in high dynamic range (HDR) imaging or other intensity dependent imaging technique such that not all of the transmissive elements have the same transmission percentage. In other configurations, polarizing elements may have different transmission values for the corresponding polarization state or elements with different transmission properties may be combined with polarization elements.

The non-polarizing elements may also be arranged as color filters, or with transmission percentages dependent on color or wavelength, similar to a Bayer pattern. In this case, the polarizing elements may also be all of the same type (either all S or all P) or any other mixture of polarization types. Grids of color filters may be used to create color cameras. For these cameras, the color information is gathered using an array of micro-color filters placed directly in front of the sensor array in a pattern. The most common pattern is known as the Bayer pattern and the filter array is known as a Bayer filter, as described in U.S. Pat. No. 3,971,065 to Bayer, which may be used with the element arrays disclosed herein. A fraction of the pixels detect the incident light at each wavelength band (red, green, and blue) as a monochromatic signal. The color image is then generated using a process known as de-mosaicing, using the measured values and calibrated response curves to calculate the R, G, and B response at the other pixels and then mixing the color values to produce the R, G, and B values that are recorded in the color digital image format, such as JPG. These color filter grids may be used to record the color information of the incoming light.

The normalization image used to normalize the ratio calculated to obtain the depth information (z-dimension information) can be calculated using the response of the pixel to determine the intensity of its associated polarization state combined with the response of the surrounding pixels used to determine the intensity of the opposite polarization state. This may be accomplished by interpolating the value for each pixel of the intensity of the orthogonal polarization state using some combination of values of the surrounding pixels. The determination of the depth coordinate (z-coordinate) based on this information is simplified since it only uses values within a single array and that have a known relationship and position within the array.

The relative intensity of the two polarization states for each pixel illustrated in FIGS. 2A-B can be determined by using the measured value of the polarizing element polarization state and the interpolated value of the other state. To obtain the range using the single sensor array, the normalized combined return for each pixel may be calculated or interpolated based on neighboring pixels in a similar fashion to that used in Bayer-filter based color digital cameras. For example, in an array of elements 30 as illustrated in FIGS. 2A-B, where S has a vertical polarizer in front of the pixel and P has a horizontal polarizing element in front of the pixel. Assuming ideal polarizers that transmit none of the other polarization state, the normalizing denominator would be calculated for pixel (2,2), for example, by using a nearest-neighbor algorithm, $$I_S^{(2,2)} + I_P^{(2,2)} = I_S^{(2,2)} + \frac{I_P^{(1,2)} + I_P^{(2,1)} + I_P^{(2,3)} + I_P^{(3,2)}}{4},\quad \text{(Eq. 1)}$$

and similarly for the P pixels using the average of the surrounding S pixels. Because most images and objects are not changing drastically from pixel to pixel, this type of de-mosaicing can be robust. Alternatively, other algorithms such as bilinear, bicubic, or other algorithms used for image de-mosaicing, can be applied. The interpolation applies to the normalizing denominator, not the pixel measurement itself. This interleaved pixel from a single sensor array can reduce optical distortions that may be caused by mis-registration when using bulk polarization separation optics such as a polarizing beamsplitter prism combined with two separate sensor arrays, as shown in FIG. 5 of the '895 patent. The 3D range information (z-axis information) for each pixel position is extracted as described in the '895 patent. As part of the de-mosaicing described above, optical and software filters can be applied to change the amount of aliasing present. The polarizing element array may be used as an anti-aliasing filter or it can be integrated with other anti-aliasing filters such as holographic elements or other structures.

The disclosed camera system 10 may also perform in the event of non-ideal polarization states or if there is any dependence of optical performance (either polarization or transmission) on angles of incidence of the returned light. In some configurations, the measured performance can be correlated with or corrected to the approximately ideal performance. Offsets and nonlinear response of either the imaging sensor array or the polarizing or transmission elements can be corrected using parameters determined using a calibration step.

In some configurations, the position of the polarizing grid (including grids with non-polarizing elements) can be aligned to the pixel positions to within some fraction of a pixel. The fraction can be <0.1 pixels, <0.2 pixels, <0.5 pixels or other fraction. In addition to these effects, the non-ideal characteristics that can affect the performance for the disclosed single sensor 3D camera can be: polarizer grid to sensor array misalignment and non-uniform spacing, non-ideal (e.g., low contrast) polarizer performance, and cross-talk between the pixels. Because both the polarizer grid and the sensor array may be fabricated using lithographic processes, uniformity of spacing can be determined by the mask design, which is can be accurate to nanometer levels. Alignment fiducials can be used to align the two grids and lithographic precision permits accurately matching the pitch of the grid elements. Non-ideal polarizer performance would result in shifts of the minima and maxima of the relative response signals over the modulation waveform. This non-ideal behavior can be handled by calibration or characterization of the response at various times and under different conditions. In some configurations, materials may be chosen to minimize or prevent relative movement of polarizer elements with respect to pixels over different temperatures, humidity, vibration, or other environmental factors. For some systems, the polarization contrast can be greater than 100:1, for some >50:1, for some >20:1, for some >10:1, or other contrast ratio that is appropriate for the application.

An effect can be pixel cross-talk where light passing through a polarization element reaches a neighboring pixel. An opaque separator band or guard band between pixels can be used to reduce possible cross-talk. In some configurations, such separator bands can be placed as opaque or semi-opaque regions 72 between the polarizing elements 70 as illustrated in side view cross-section of an integrated polarizing array and sensor system 60 in FIG. 5. The array structure 60 includes a polarizing element array layer 62, one or more transparent layers 64, and a sensor substrate layer 66 that includes a substrate 74, sensor pixels 69 and electronic or metallization layer 68.

The separator bands 72 are shown in FIG. 5. Such opaque regions can be part of the lithographic mask design or can be doped regions or optical absorbing regions similar to the fabrication process for color filters such as Bayer filters. Such separator bands can be made of reflective layers or other techniques to reduce the transmission, including transmission based on wavelength or angle of incidence. The separator band opaque region 72 can be, for example, any suitable material such a metal, like aluminum, or photo resist, or polymer, or another material such as a semiconductor material like polycrystalline silicon or other types of semiconductor material. For example, for a 1 µm wide guard band between micro-polarizers spaced 10 µm from the FPA, angles of incidence >6° (equivalent to <f/5) may reach the adjacent pixel for some FPA micro-lens designs. Some configurations could make use of thicker separation bands, such as 2 µm or wider, to further reduce cross-talk, depending on the design.

In other configurations, such as the integrated polarizer sensor array 80 illustrated in FIG. 6, the separator guard bands 92 are made approximately as wide as the pixel pitch or wider, such that they block a substantial fraction of a pixel 89. The array structure 80 includes a polarizing element array layer 82, one or more transparent layers 84, and a sensor substrate layer 86 that includes a substrate 94, sensor pixels 89 and electronic or metallization layer 88.

FIG. 6 illustrates a design which uses polarizing elements 90 that are 2 pixels wide (for example, 2×1 or 2×2 or 2×3 or other 2D arrangement), with a guard band (G) 92 covering the third pixel 89. In this configuration, the guard band 92 can be opaque, reflective, semi-transparent, or transparent or some combination, depending on the design, to reduce cross-talk. The guard bands 92 could also be allowed to vary across the polarizing element grid to reduce fabrication costs or for other design purposes. Such guard bands 92 can be combined with the variety of arrangements of polarizing elements described above. In addition to preventing light cross-talk between the pixels, other configurations can address pixel cross-talk by calibration as long as it is deterministic and constant or can be characterized for some or all imaging parameters. If the pixel cross-talk must be reduced, wider guard bands can be specified or combinations of microlens and or guard bands can be added to the design or guard pixels can be used. In any design, the microlens array can be placed in front of or behind the pixelated polarizer or transmission grid structure as appropriate.

In other configurations, opaque or reflective structures can be included as separator bands or guard bands 112 in the stack of transparent layers 104 in front of the pixel detector layer 106 to reduce the amount of cross-talk light that can reach other pixels. An example of this configuration is shown in the integrated array 100 of FIG. 7. The array structure 100 includes a polarizing element array layer 102, one or more transparent layers 104, and a sensor substrate layer 106 that includes a substrate 114, sensor pixels 109 and electronic or metallization layer 108. FIG. 7 shows an exemplary placement of opaque structures as vertical walls 112 between pixels 109 to prevent light incident on one polarizing element 110 from reaching a neighbor pixel. Such structures 112 can reach the polarizing element grid structure layer 102, or the structures may only reach >90% of the height between sensor layer 106 and structure 102, or >75%, or >50%, or other amount as appropriate for the design of interest. In some configurations, these structures 112 can be shaped to be narrower on the top (farthest from the sensor) and wider on the bottom. Other configurations can affect cross-talk by making the structures 112 wider at the top or completely vertical. The sensor 109 design itself and metallization layers 108 can also be shaped in similar fashion or made taller to reduce the amount of light that can reach adjacent sensor pixels 109. Other configurations can make use of absorbing material to reduce scattered light or other structures to direct light away from the other pixels. In other configurations, the structures 112 can be semi-opaque or semi reflective.

Transmission-Based Arrays

In other configurations, the distinction between two or more states can be made via other transmission variations rather than polarization variations such as those described above. For example, a variable Fabry-Perot etalon can be used to vary the transmission by some means of control similar to that in the '895 patent for polarization states. For example, the phase within a Fabry-Perot cavity can be varied by applying a voltage to an electro-optic material, by applying a voltage to a piezo-electric material, by applying a voltage to a liquid crystal, or some other similar means. In such a case, the pixels of an imaging sensor can also be divided into different groups similar to the illustration in FIG. 3. One group of pixels, such as those indicated by S in FIG. 2A, can have a reflective coating of suitable reflectivity R to achieve the desired finesse of the Fabry-Perot etalon. Another group of pixels, such as those indicated by P in FIG. 2A, can have reflective or anti-reflective coating that has a different transmission level, such as 100%, or >99%, or >95%, or >90% or >80% or other desired transmission. These high transmission pixels provide a signal value that can be used as the denominator calculated using Eq. (1), where the value for the S pixels can be determined by interpolation similar to the method described above.

Such groupings of pixels can be arrayed as illustrated in FIGS. 2-7 or other arrangement that may be desirable. More complex groupings of transmission, with more than two groups, can also be used. The reflective coatings may be deposited directly onto the imaging sensor, for example on top of the passivation layer of the sensor array chip. Alternatively, such coatings can be deposited on an additional substrate that can be placed in front of the imaging sensor array with the reflective areas aligned to the pixels of the imaging sensor. Other configurations may have such coatings deposited within the stack of layers that make up the sensor. Deposition of these coatings can be performed by techniques known for creating reflective coatings and may use transparent materials such as oxides or fluorides or other similar materials or the coatings may be made of thin or semi-transparent layers of metals or other more opaque or semi-transparent materials, such as gold, silver, aluminum, semiconductor, or other such material. Materials can be chosen to be advantageous at specific wavelengths of interest or may be chosen for use with multiple wavelengths or broadband illumination.

This transmission patterning can be done on a single substrate or it may be part of a broader stack of coating for electric field application or other transmission patterning. For example, for a Fabry-Perot modulator, the transmission grid can be patterned on elements forming both sides of the Fabry-Perot cavity. Such placement can be selected based on the system design requirements.

Additionally, the coating pattern or grouping may be applied in a way to maintain a uniform thickness, either in a single process step or multiple deposition and etch steps.

Figure 8:
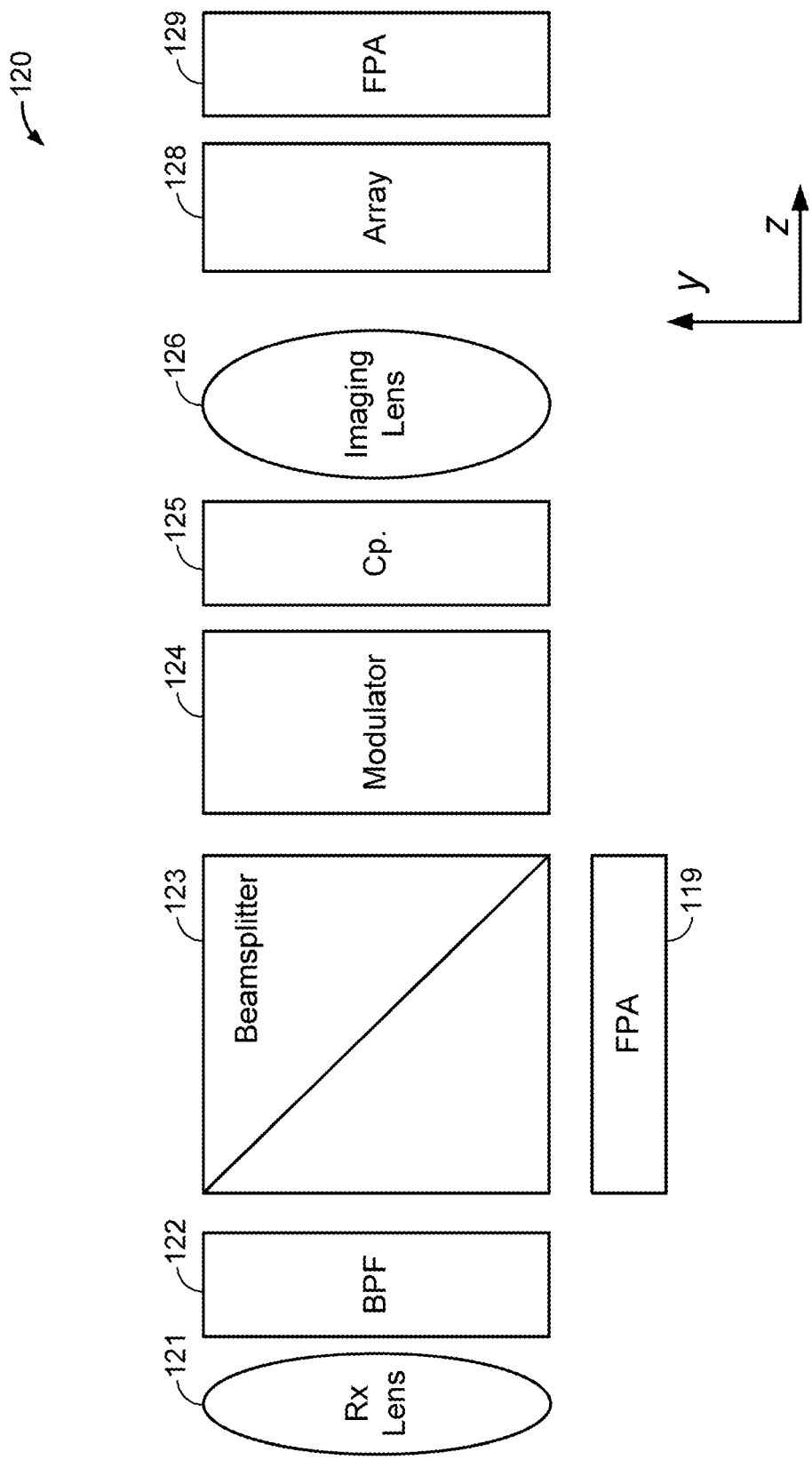
FIG. 8 schematically illustrates another example of a 3D imaging system.

FIG. 8 schematically illustrates another example of a 3D imaging sensor system or camera 120. Sensor system 120 optionally may include visible imaging subsystem 530 show and described in connection with FIG. 5 of the '895 patent, which portions of the '895 patent are specifically incorporated by reference as though set forth in their entirety herein. The subsystem 530 is omitted from FIG. 8 for clarity.

The system 120 includes receiving (Rx) lens 121, bandpass filter (BPF) 122, modulator 124, compensator (Cp.) 125, imaging lens 126, and FPA 129, each of which may be the same as described with respect to the corresponding components illustrated in FIG. 5 of the '895 patent, such description of the FIG. 5 elements of the '895 patent being specifically incorporated by reference as though fully set forth herein. However, system 120 also includes element array 128, which may be any of the polarizing arrays or transmission-based arrays described herein, for example, with reference to FIGS. 2-7.

Some configurations may use all camera elements shown in FIG. 5 of the '895 patent. For example, the system 120 can include beamsplitter 123 which is at any suitable position before the modulator (here, between bandpass filter 122 and modulator 124), which directs a portion of the received light to FPA 119, which obtains an image of the scene based thereon. The remainder of the light is transmitted to modulator 124, which modulates the light transmitted there through, and FPA 129 obtains an image of the scene based thereon. In some configurations, the images obtained by FPA 119 and FPA 129 may differ in that the former is based on unmodulated light, while the latter is based on modulated light. The image obtained by FPA 119 may be used to normalize the image obtained by FPA 129. Specifically, the intensity at any pixel (i,j) of FPA 119 may be used as the value $I_{total,i,j}$ in the distance calculations discussed in the '895 patent with reference to equations (8) to (15), which subject matter is specifically incorporated by reference as if fully set forth herein. Alternatively, in some configurations the intensities measured by FPA 119 are not needed, instead using the demosaiced intensity sum from FPA 129 as described above.

In other configurations, FPA 119 is used for images a different wavelength or wavelengths, such as visible light or infrared light or other spectral region. In other configurations, some of the components shown may be omitted or changed in order. For example, in some configurations, the beamsplitter 123 may be replaced by another variety of polarizing plate or optic or for some instances, omitted altogether if the incident polarization state is of sufficient quality. In some configurations, the compensator 125 and/or imaging lens can be omitted. The bandpass filter 122 can also be omitted for suitable environments where background light can be neglected. Alternatively, the components 124 through 128 or some subset thereof can be repeated in other configurations between beamsplitter 123 and the FPA 119. The modulation patterns between FPA 119 and 129 can be the same or of different lengths or other differences in shape or structure, as described in the '895 patent. The signals obtained from either or both of the FPAs 119, 129 can be combined in algorithms described in the '895 patent.

Other techniques described in the '895 patent can be combined with a 3D camera using such a transmission array disclosed herein.

Figure 9:
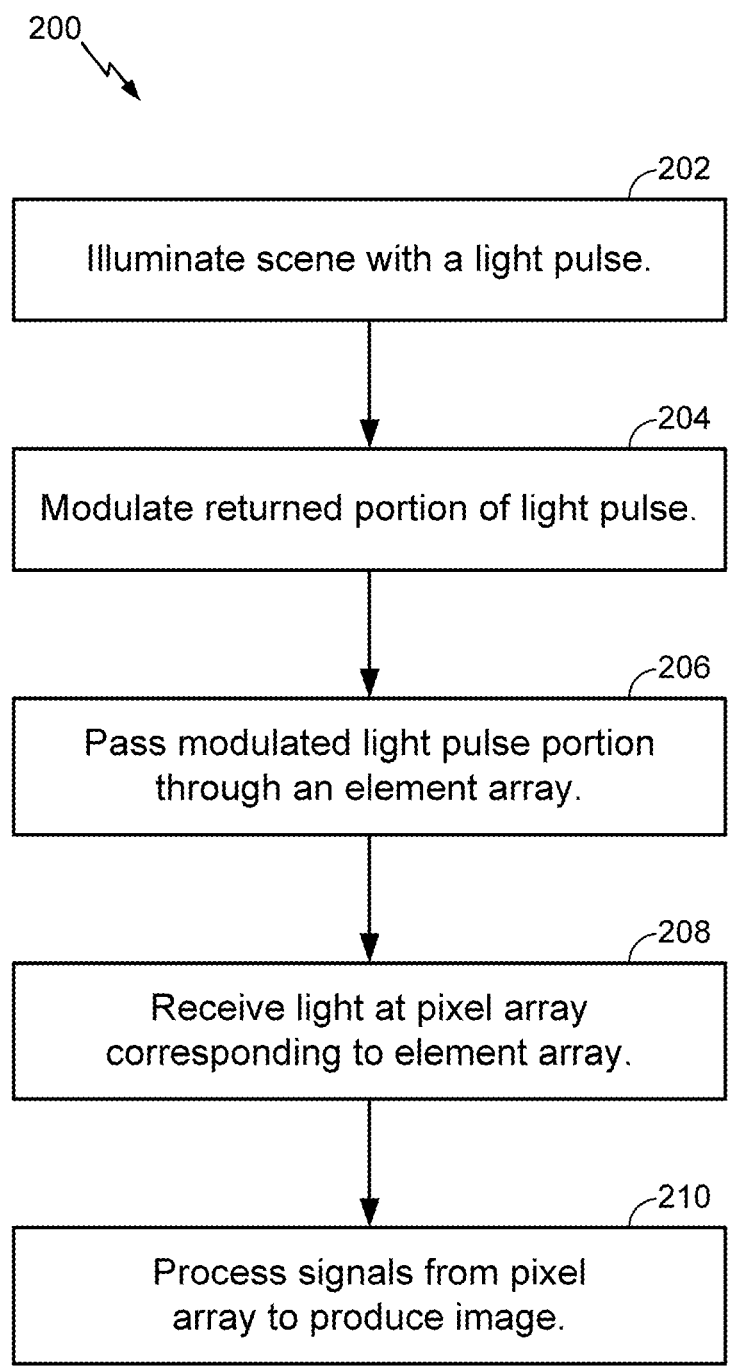
FIG. 9 is a flowchart illustrating an example method of capturing a 3D image using the system described herein.

FIG. 9 is a flowchart 200 illustrating an example method of capturing a 3D image using the systems described herein. In box 202, the scene is illuminated with a light pulse, for example, a laser pulse as described in the '895 patent, emitted from the light source 25. Portions of the light pulse are scattered or reflected from objects in the scene and return to the receiving optics of the 3D camera. In box 204, the returned portion of the light pulse is modulated as a function of time by a modulator within the camera. The modulator may be any suitable optical modulator, for example a Pockels cell or alternatively, a Fabry-Perot modulator, both described in the '895 patent.

Next, in box 206, the modulated returned light pulse portion passes through an element array, such as any of those disclosed herein. The element array is arranged to correspond to pixels in a sensor array in a predefined manner. In box 208, the light portion is received at the pixelated sensor array, which generates electrical signals in response to the received light. The signals are then processes by a processor, such as a digital signal processor (DSP) or microprocessor, running software to determine time-of-flight information, which can then be used to determine z-axis information to produce a 3D image of the scene.

It should be understood that, depending on the example, certain acts or events of any of the methods described herein can be performed in a different sequence, may be added, merged, or left out altogether (e.g., not all described acts or events are necessary for the practice of the method). Moreover, in certain examples, acts or events may be performed concurrently, e.g., through multi-threaded processing, interrupt processing, or multiple processors, rather than sequentially. In addition, while certain aspects of this disclosure are described as being performed by a single module or component for purposes of clarity, it should be understood that the techniques of this disclosure may be performed by any suitable combination of components or modules associated with a 3D imaging system.

In summary, the systems and methods disclosed herein are able to measure or assess the relative phase or other modulation by using an appropriate grid/array that has groups of distinct elements that pass different signals. The type of element in the grid/array is determined based on the needs of the modulation technique chosen. For example, polarizing elements can be used for modulation techniques that change the polarization phase or state of the incoming light. Or transmission elements can be used in a Fabry-Perot arrangement where the phase is modulated. This arrangement allows for at least two different time dependent transmission functions that can be separated by pixels in the sensor array.

Other configurations and modifications of the methods, devices, cameras, systems and apparatuses described above will occur readily to those of ordinary skill in the art in view of these teachings. Thus, the foregoing description is illustrative and not restrictive. Although certain exemplary techniques have been described, these and other techniques are within the scope of the following claims.

What is claimed:
1. A 3D imaging system, comprising:
an optical modulator configured to modulate a returned portion of a light pulse as a function of time;
an array of optical elements for receiving a modulated returned portion of the light pulse, wherein a first optical element set of the optical elements has a predetermined first optical transmission state different from a second predetermined optical transmission state of a second optical element set of the optical elements;

a sensor array of pixels corresponding to the array of optical elements, a first pixel set of the sensor array is spatially aligned with the first optical element set, and a second pixel set of the sensor array is spatially aligned with the second optical element set such that light output from the first and second optical element sets is provided to the sensor array without an intervening free space focusing optic between the sensor array and the array of optical elements; and a processor operatively coupled to the sensor array and configured to determine a range based on an unmodulated reference and intensity values of the first and second pixels sets.

2. The system of claim 1, wherein the array of optical elements includes a plurality of polarizing elements.

3. The system of claim 2, wherein the polarizing elements include polarizing elements with substantially orthogonal polarization slates relative to each other.

4. The system of claim 1, wherein the optical modulator is configured to modulate the polarization state of the returned portion of the light pulse.

5. The system of claim 1, wherein the first optical element set includes afirst reflective coating that has a first transmission level and the second optical element set includes a second reflective coating that has a second transmission level different from the first transmission level.

6. The system of claim 1, wherein the optical modulator includes a variable Fabry-Perot etalon.

7. The system of claim 1, wherein the array of optical elements is integrally formed on the sensor array of pixels.

8. The system of claim 1, wherein the array of optical elements includes one or more separator bands configured to reduce cross-talk between pixels of the sensor array.

9. The system of claim 1, further comprising one or more separator walls formed between the pixels in the sensor array to reduce cross-talk between the pixels.

10. The system of claim 1, further comprising a light source for emitting the light pulse.

11. The system of claim 1, further comprising a receiving lens located before the modulator for receiving the returned portion of the light pulse.

12. The system of claim 1, wherein the optical modulator, sensor array, and array of optical elements are integrally formed into a single unit.

13. The system of claim 1, further comprising a receiving lens located before the modulator for receiving the returned portion of the light pulse.

14. The system of claim 1, wherein the optical modulator includes a Pockels cell.

15. A method, comprising:
illuminating a scene with a light pulse;
modulating a returned portion of the light pulse;
passing the modulated returned portion of the light pulse through an array of optical elements, wherein a first optical element set of the optical elements has a predetermined first optical transmission state different from a second predetermined optical transmission state of a second optical element set of the optical elements;
receiving at a sensor array of pixels light output from the array of optical elements, a first pixel set of the sensor array is spatially aligned with the first optical element set, and a second pixel set of the sensor array is spatially aligned with the second optical element set such that light output from the first and second optical element sets is provided to the sensor array without an intervening free space focusing optic between the sensor array and the array of optical elements; and
determining a range based on an unmodulated reference and intensity values of the first and second pixels sets.

* * * * *